United States Patent

[11] 3,630,321

[72] Inventor Harold S. Hollnagel
918 Laramie Lane, Milwaukee, Wis. 53022
[21] Appl. No. 43,662
[22] Filed June 5, 1970
[45] Patented Dec. 28, 1971

[54] SURGE BRAKE DAMPER
4 Claims, 2 Drawing Figs.

[52] U.S. Cl. .................................................. 188/112,
188/1 B, 280/506
[51] Int. Cl. ..................................................... B60t 7/20
[50] Field of Search .......................................... 188/112, 1
B; 280/428, 446 B, 506, 406 A

[56] References Cited
UNITED STATES PATENTS
2,138,267  11/1938  Christenson .................  188/112

2,998,268  8/1961  Witter ...........................  280/506
3,294,421  12/1966  Mathisen ......................  280/446

*Primary Examiner*—Duane A. Reger
*Attorneys*—John W. Michael, Gerrit D. Foster, Bayard H. Michael, Paul R. Puerner, Joseph A. Gemignani, Andrew O. Riteris and Spencer B. Michael ABSTRACT: In use, there is frequent relative motion between the surge brake actuator housing (and the associated trailer) and the hitch bar. The arms fixed to the housing hold the friction pads against the hitch bar to damp the relative motion. This damping replaces or supplements the hydraulic shock absorber usually associated with surge brake units. The loading applied to the friction pads is adjustable to control the rate of brake application.

PATENTED DEC 28 1971

3,630,321

Inventor
Harold S. Hollnagel
By Bayard H. Michael
Attorney

SURGE BRAKE DAMPER

BACKGROUND OF INVENTION

Since surge-brake systems operate in response to the relative motion between the trailer and the hitch and there is a tendency towards such motion even at steady towing speeds, the systems are usually provided with hydraulic shock absorbers which are generally too small (due to space limitations) to withstand the relatively constant work. They fail soon and then the brakes are prone to frequent and undesired application which causes undue wear and unpleasant jolting of the towing vehicle.

SUMMARY OF INVENTION

By providing a friction-type damper, greatly improved performance is obtained simply by reason of greater capacity to dissipate energy. The adjustability provided with this arrangement not only compensates for wear but also permits control of the rate of brake application, giving smoother performance. Such control has not been available in connection with surge brakes.

DESCRIPTION OF PREFERRED EMBODIMENT

Figure 1:
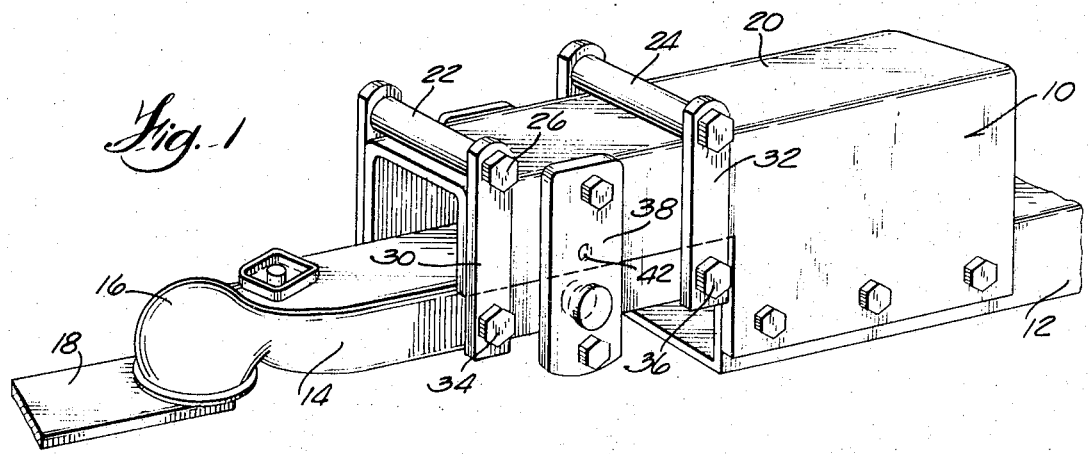
FIG. 1 is a perspective view of the damper applied to a typical surge brake arrangement.

The housing 10 serves to partially enclose and protect the surge brake actuator (not shown) and to connect the trailer draw bar 12 and hitch bar 14, which is provided with the usual ball socket 16 coupled to the cooperating ball on the vehicle hitch 18. The flat top 20 of housing 10 has a pair of sleeves 22,24 welded thereto serving as bearings for bolts 26,28. The bolt head and a locknut retain depending arms 30,32 pivoted on the bolt. The bolts 34,36 passing through the hitch bar 14 also pass through the depending arms 30,32 and, thus, the hitch bar 14 can move relative to the trailer. As illustrated, the arms 30,32 are in the generally vertical position. This is the position which they would occupy if the towing vehicle is backing up or if the trailer is tending to overrun the towing vehicle. In the normal towing condition, the hitch bar 14 pulls away from the trailer draw bar 12 under control of the swing arms 30,32 and it is this relative motion which would act to release the brakes while the tendency of the vehicle and trailer to come together would be used to apply hydraulic pressure to the trailer brakes. This sort of construction is quite customary.

Figure 2:
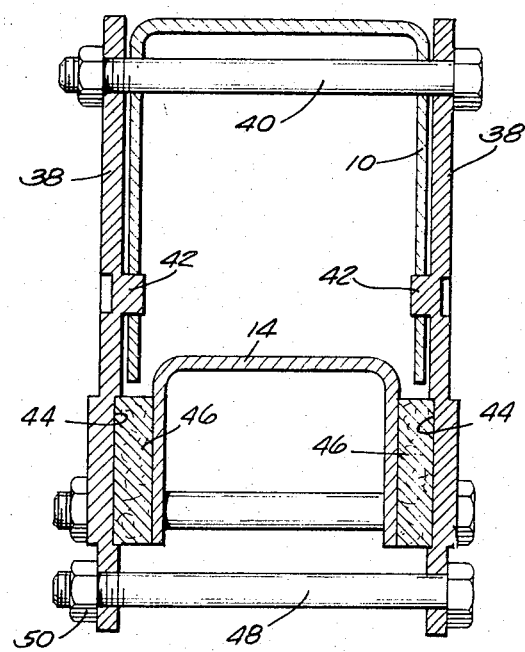
FIG. 2 is a vertical section of FIG. 1. This view omits the "background" of the view (such as the actuator itself) in the interest of clarity.

A plate 38 is fixed at each side of the actuator housing 10 by means of the through bolt 40 and the registration of the pin 42 formed in the side of the plate 38 and projecting into the cooperating hole in the housing 10, as seen most clearly in FIG. 2. At the lower portion, each plate is provided with an area formed in the nature of a circular depression 44, which receives the circular friction pad 46 and serves to hold the pad against the hitch bar 14. The lower extremities of the two plates are interconnected by means of bolt 48 provided with a locknut 50 which can be turned to adjust the pressure applied by the plates against the friction pads 46 and, hence, determine the amount of friction load resisting relative motion between the drawbar 12 and the hitch bar 14.

Since there is adequate cooling, the life of the friction pad is remarkably long. Any wear can be compensated by drawing up on nut 50 to bring the plates 38 a little closer together. In addition, this adjustable feature permits control of the rate at which the trailer can overtake the towing vehicle and, therefore, there is control on the application of the brakes.

This design is compatible with application in the field or as original equipment. It can either supplement or replace the customary shock absorbers.

I claim:
1. The combination with a surge brake actuator assembly of the type responding to relative motion between the trailer hitch bar and the trailer drawbar, of a damping arrangement for damping the relative motion, comprising
   a friction pad fixed relative to one of the bars and acting on the other of the bars.
2. The combination of claim 1 including means for adjustably loading the friction pad to adjust the rate of energy dissipation.
3. The combination of claim 2 including a support carried by said one bar and having the pad supported thereby in proximity to said other bar and the means for adjustably loading the pad acts on the support to squeeze the pad between the support and said other bar.
4. The combination of claim 3 in which there is a support on each side of said one bar and the adjustable loading means acts to draw the supports towards each other, said other bar being between the supports whereby a friction pad is pressed against each side of said other bar.

* * * * *